(12) United States Patent
Behm et al.

(10) Patent No.: US 7,073,720 B2
(45) Date of Patent: *Jul. 11, 2006

(54) LOTTERY TICKET BAR CODE

(75) Inventors: William F. Behm, Roswell, GA (US); Fred Finnerty, Dawsonville, GA (US)

(73) Assignee: Scientific Gaines International, Inc., Alpharetta, GA (US)

( * ) Notice: Subject to any disclaimer, the term of this patent is extended or adjusted under 35 U.S.C. 154(b) by 94 days.

This patent is subject to a terminal disclaimer.

(21) Appl. No.: 10/783,327

(22) Filed: Feb. 20, 2004

(65) Prior Publication Data

US 2004/0227000 A1 Nov. 18, 2004

Related U.S. Application Data

(60) Continuation-in-part of application No. 10/278,892, filed on Oct. 24, 2002, now Pat. No. 6,736,324, which is a continuation of application No. 09/557,337, filed on Apr. 24, 2000, now Pat. No. 6,435,408, which is a division of application No. 09/165,666, filed on Oct. 3, 1998, now Pat. No. 6,053,405, which is a continuation-in-part of application No. 08/837,304, filed on Apr. 11, 1997, now Pat. No. 5,818,091, which is a continuation-in-part of application No. 08/486,588, filed on Jun. 7, 1995, now Pat. No. 5,621,200, which is a continuation-in-part of application No. 08/263,890, filed on Jun. 22, 1994, now Pat. No. 5,471,039.

(60) Provisional application No. 60/350,215, filed on Nov. 2, 2001.

(51) Int. Cl.
*G06K 19/00* (2006.01)

(52) U.S. Cl. ...................... 235/487; 283/903

(58) Field of Classification Search ................ 235/487, 235/462.01; 283/100–102, 901–902
See application file for complete search history.

(56) References Cited

U.S. PATENT DOCUMENTS

| | | | | |
|---|---|---|---|---|
| 4,725,079 A | * | 2/1988 | Koza et al. | 283/73 |
| 5,835,576 A | * | 11/1998 | Katz | 379/93.13 |
| 6,308,991 B1 | * | 10/2001 | Royer | 283/102 |
| 6,379,742 B1 | * | 4/2002 | Behm et al. | 427/7 |
| 2004/0023711 A1 | * | 2/2004 | Knapp | 463/17 |
| 2005/0167922 A1 | | 8/2005 | Finocchio | 273/292 |

FOREIGN PATENT DOCUMENTS

GB 2171054 A * 8/1986

* cited by examiner

*Primary Examiner*—Thien M. Le
*Assistant Examiner*—Lisa M. Caputo
(74) *Attorney, Agent, or Firm*—Michael B. McMurry (57) ABSTRACT

Security can be provided for lottery tickets having data printed thereon in a bar code or other machine readable media by covering only a portion of the bar code with a scratch-off material. Removing the scratch-off material, or in some cases only a portion of the scratch-off material, can permit machine validation of the lottery tickets. For bar codes having a specified level of redundancy, it is desirable to cover at least enough of the bar code to prevent the machine reading of ticket validation data encoded in the bar code. Also, a lottery ticket can include a bar code printed on the ticket having both inventory and validation data along with a bar code printed on the front of the ticket including the validation data. All or part of the bar code printed on the front of the ticket can be covered by a scratch-off material. Also, the validation and redemption process can be expedited by having a player ticket checker read a ticket identifier printed on the lottery ticket so that this information can be checked and automatically entered in an agent terminal.

33 Claims, 4 Drawing Sheets

LOTTERY TICKET BAR CODE

CROSS REFERENCE TO RELATED APPLICATIONS

This application is a continuation in part of Ser. No. 10/278,892 filed Oct. 24, 2002, now U.S. Pat. No. 6,736,324; which is a continuation of Ser. No. 09/557,337 filed Apr. 24, 2000, now U.S. Pat. No. 6,435,408 and also claims priority from Provisional Application 60/350,215 filed Nov. 02, 2001; application Ser. No. 09/557,337 is a division of Ser. No. 09/165,666 filed Oct. 3, 1998, now U.S. Pat. No. 6,053,405; which is a continuation in part of Ser. No. 08/837,304 filed Apr. 11, 1997, now U.S. Pat. No. 5,818,091; which is a continuation in part of Ser. No. 08/263,890 filed Jun. 22, 1994, now U.S. Pat. No. 5,471,039; which is a continuation in part of Ser. No. 08/486,588 filed Jun. 07, 1995, now U.S. Pat. No. 5,621,200.

FIELD OF THE INVENTION

This invention generally relates to lottery tickets and in particular to lottery ticket bar codes redemption methods.

BACKGROUND OF THE INVENTION

It has become conventional for lottery tickets that have a scratch-off material covering play indicia printed on the ticket to also provide a bar code printed on the ticket for validation or authentication purposes. Typically, when a winning ticket is presented for payment, the bar code is read by a bar code reader located in a lottery agent terminal and a 3 or 4 digit security code, hidden under a latex or scratch-off coating, is entered manually by a clerk using a key pad on the terminal. The dual action of reading the bar code and entering the security code confirms that the ticket is indeed a winner prior to payment of the winning amount. Forcing the clerk to find and enter the security code gives both the player and the lottery administration the assurance that a retailer did not prescreen the ticket in an attempt to pick out winning tickets because finding the security code requires that some latex must be removed from the ticket. However, attempts have been made to defraud lotteries where the clerks pre-screen tickets for winners before they are sold by picking out the 3 or 4 digit code security code, guessing the 3 digit code or even pasting an entirely different bar code over the existing bar code on the lottery ticket.

One approach to overcoming the problem of prescreening of unsold tickets is described in U.S. Pat. No. 6,053,405 where latex sensing capability is used to insure that that sufficient latex has been removed from the ticket prior to validation. Also, circuit elements are printed underneath the bar code in order to detect tampering with the bar code. Using this technique it is possible to print the bar code on the front or the back of the ticket, separate from the latex covering.

A second approach to overcoming this problem is described in U.S. Pat. No. 6,308,991 where a scratch-off material is printed over the entire bar code. Either the bar code alone is covered by a separate portion of the scratch-off material or the bar code in combination with play indicia is covered by the scratch-off material. However, covering the entire bar code has at least one significant disadvantage. In this approach, almost all of the scratch-off material must be removed from the bar code in order to be able to have the bar code successfully read by a scanner. Requiring a player or a lottery agent to completely remove a scratch-off coating from a bar code, especially on an instant lottery ticket where speed and convenience of redemption are desirable characteristics of this product, can result in a time consuming and inefficient method of operation.

Another problem relates to the redemption of lottery tickets using a win checker, of the type described in U.S. Pat. No. 5,417,424. In this process, the player uses a win checker associated with an agent terminal to read a win code printed on the lottery ticket, and if the win code indicates that the ticket is a winner, the player takes it to the lottery agent for redemption. In many cases, the lottery agent then has to enter a security code or ticket identifier printed in human readable form manually on the terminal's keyboard in order to complete the validation and redemption process. This can also result in a time consuming and inefficient method of operation.

SUMMARY OF THE INVENTION

It is therefore an object of the invention to provide a lottery ticket having a bar code that is only partially covered by a scratch-off material.

It is another object of the invention to provide a lottery ticket having a bar code containing validation data where only a portion of the bar code is covered by a scratch-off material such that the validation data cannot be read by a bar code reader without removing the scratch-off material. The scratch-off material can have a predetermined shape such as a circle in order to facilitate evidence of tampering. Alternatively, the scratch-off material can be printed over the bar code as a horizontal or vertical strip obscuring a predetermined portion of the data in the bar code. For example, when using a 2 dimensional code, such as PDF-417, vertical stripes can be used to obscure one or more columns of data in the bar code.

A further object of the invention is to provide a lottery ticket having a bar code containing validation data formatted, in for example code words, having a predetermined level of redundancy where only a portion of the validation data or code words is covered by a scratch-off material such that the portion of code words covered by the scratch-off material exceeds the level of redundancy sufficiently to prevent decoding of the validation data without removing at least a portion of the scratch-off material.

Yet another object of the invention is to provide a lottery ticket having a bar code containing validation data where only a portion of the bar code is covered by a scratch-off material such that the validation data cannot be read by a bar code reader without removing the scratch-off material and where the scratch-off material includes a printed instruction to remove the scratch-off material. The scratch-off material can also be printed with an indication of prizes that can be won as an incentive to rub off the material.

Still another object of the invention is to provide a lottery ticket having a bar code with minimum information content on the front of the ticket that is at least partially covered by a scratch-off material such that the ticket can be securely validated in a keyless manner after the scratch-off material has been removed.

Another object of the invention is to provide a lottery ticket having a machine readable ticket identifier in conjunction with a player ticket checker. In some cases, the ticket identifier can be used in combination with a win code also printed on the lottery ticket in machine readable form.

The objects of the invention also include providing a mechanism for redeeming lottery tickets having ticket identifiers printed on the tickets. This mechanism includes a player ticket checker with a data reader for reading the ticket identifiers and a pre-validation file in an agent terminal that is in communication with the player ticket checker. The data reader can read the ticket identifier and if the lottery ticket is identified by the pre-validation file, the need for a lottery agent to key the ticket identification in to the agent terminal is obviated. The data reader can also be used to read a win code if one is included on the lottery ticket.

DETAILED DESCRIPTION OF THE INVENTION

Figure 1:
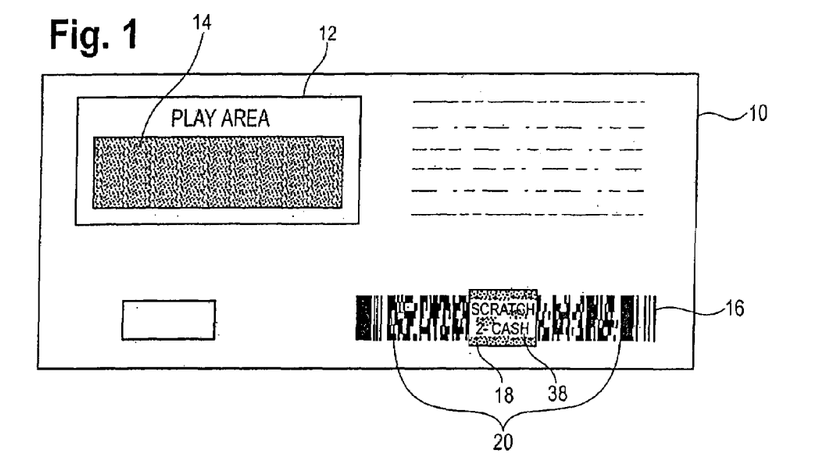
FIG. 1 is a plan view of a lottery ticket having a two dimensional (2-D) PDF-417 bar code where a portion of the bar code is covered by a scratch-off coating according to the invention.

FIG. 1 illustrates the front of a conventional instant type lottery ticket 10 having a play area 12 covered by a scratch-off material 14 which is usually comprised of a latex based composition printed over play indicia (not shown). In this embodiment of the invention, a two dimensional (2-D) bar code 16 containing validation data as well as inventory data is printed on the lottery ticket 10. In order insure the removal of a scratch-off material prior to the validation of the ticket 10, a portion of the bar code 16 is covered by a scratch-off material 18. The scratch-off material 18 can be the same as the scratch-off material 14 printed on the play area 12 of the lottery ticket. Here, only a portion of the bar code 16 is covered by the scratch-off material 18 to make it easier for a player or lottery agent to remove the scratch-off material 18 during the validation process. This will also facilitate the validation process since players in particular are unlikely to take the time to remove a scratch-off material that covers an entire bar code which can result in substantial work for the retailer's clerk or a substantial number of misreads from a bar code scanner in a lottery terminal. However, the scratch-off material 18 should cover a sufficient portion of the bar code 16 in order to prevent validation of the lottery ticket 10 if the bar code 16 is read by a bar code reader prior to removal of the scratch-off material.

It should be noted that the use of the term "bar code" as used herein in the context of the invention generally represents optically machine readable information printed on a lottery ticket and would include for example optical character recognition (OCR) type characters, information printed in various matrix schemes, such as the Data Matrix 2-D bar code described at idautomation.com, as well as other optically readable information that might be developed in the future.

In the embodiment of the invention shown in FIG. 1, the valuation data can be stored in the bar code 16 as PDF (Portable Data Code) code words printed in a 2-D bar code format in the data region 20 of the bar code 16. Preferably, the code words will have a predetermined level of redundancy. For example, where the data region 20 has 3 columns and 6 rows with 18 code words, a level 2 error correction permits decoding with up to 8 code words unreadable. Therefore, at least 9 code words should preferably be covered by the scratch-off material 18 to prevent the reading of the validation data without removing any of the scratch-off material 18. Similarly, in the data region 20 where there are 6 columns and 6 rows with 36 code words, a level 3 error correction would permit reading of the validation data with 16 code words being unreadable. Here, at least 17 code words should preferably be covered to prevent reading of the bar code data. Thus, it is desirable to cover at least one more code word or other type of redundant data in the bar code 16 than required to make the data in the data region 20 readable. This arrangement using PDF codes with specified levels of redundancy, also has a very significant advantage. Since it is only necessary to remove enough of the scratch-off coating to make the minimum number of code words required to decode the validation data readable, the player or lottery agent only has to remove a comparatively small portion of the scratch-off material. In the cases of the level 2 and 3 error correction described above, only one code word would need to be removed by the player to make the valuation data stored in the bar code 16 readable. Thus, it is not necessary to rely on diligent and thorough removal of the scratch-off material 12 to have an efficient validation process.

In general, it is desirable to cover with the scratch-off material any information in a bar code redundant to the information in the bar code that is covered by the scratch-off material in order to prevent machine reading of the validation data. this redundant information can include error correction codes built into the bar code such as, for example, a Reed Solomon error correction code integrated into an ECC200 Data Matrix bar code.

Figure 2A:
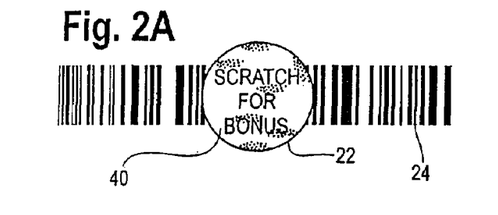
FIGS. 2A–D are plan views of alternate bar codes for use with the lottery ticket of FIG. 1 including in FIG. 2A a conventional one dimensional (1-D) interleaved 2 of 5 bar code having a portion of the code covered by a scratch-off coating according to the invention.
Figure 2B:
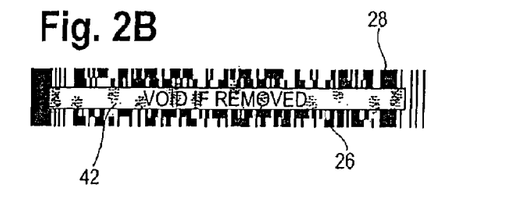
Figure 2C:
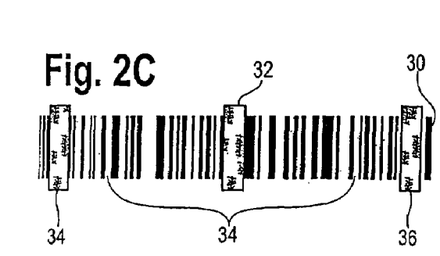

FIGS. 2A–2C illustrate different shapes of the scratch-off material that can be used to cover a portion of the bar code on the lottery ticket 10. The scratch-off material 18 is shown in FIG. 1 as a rectangle covering a data region 20 of the bar code 16. However, other shapes or configurations of the scratch-off material can be used as well. In some circumstances, shapes that are designed to enhance visual evidence of tampering can be used. As shown in FIG. 2A, printing a scratch-off material 22 in a circular configuration over a portion of a bar code 24 is one such example. FIG. 2B illustrates a scratch-off material 26 printed in a horizontal strip across a portion of a bar code 28. In this case, the bar code 28 is a two-dimensional bar code and the strip 26 is placed to cover a sufficient number of code words to prevent reading the bar code 28. Also, as shown in FIG. 2C, the scratch-off material can be printed over a bar code 30 in one or more vertical strips such as a vertical strip 32 covering a portion of a data region 34 of the bar code 30. Also, vertical strips, for example a pair of strips 34 and 36 of the scratch-off material, can be printed over the start pattern and stop pattern (not shown) of the bar code 30 although covering these patterns is not preferable because reading by a bar code reader is made easier by simply positioning photocopies of start and/or stop codes over the latex. In some circumstances, shapes that are designed to enhance visual evidence of tampering can be used.

To enhance player participation and the validation process, the scratch-off materials 18, 22, 32, 34 and 36 can include human readable information such as incentives to scratch-off this material. As shown in FIG. 1, the scratch-off material 18 is printed with an instruction "scratch 2-Cash". Other incentives, such as "Scratch For Bonus" 40 as shown in FIG. 2A, or "Rub For Prize Value" can be printed on the scratch-off material 22 that indicate that a bonus prize is printed on the lottery ticket 10 under the scratch-off material 22. Similarly, a "Void If Removed" instruction 42 can be printed over the scratch-off material 26 as depicted in FIG. 2B. This instruction 42 is similar to some conventional lottery tickets where a "Void If Removed" instruction is printed on a scratch-off material covering human readable validation digits where the scratch-off material is removed by the lottery agent when the ticket is presented for redemption.

Figure 2D:
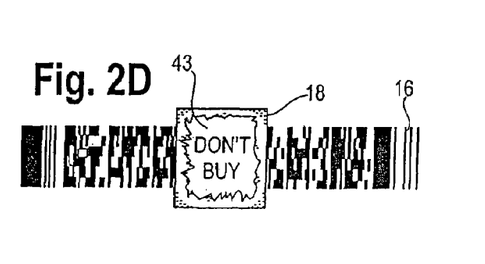

FIG. 2D shows another embodiment of the invention that can enhance the security of the lottery ticket 10. Here, under a scratch-off material such as 18 on the bar code 16, a consumer warning 43 can be printed such as "Don't Buy." In this case, the warning 43 will indicate to the player that the scratch-off material 18 has been improperly removed and consequently should not buy the lottery ticket 10. Preferably, the warning 43 should not interfere with the reading of the bar code 16. For example, if the warning 43 is printed in a red ink, this text will not interfere with reading of the bar code 16 since bar code readers typically illuminate the bar code in red light.

With reference to FIG. 2C where the bar code 30 is printed in a one-dimensional (1-D) bar code format, in some cases it would only be necessary to cover the portion of the bar code 30 that corresponds to the human readable validation data securely printed below the scratch-off material, 32. For example, instant lottery tickets generally have the following data printed on the ticket in human readable form:

| Data | Length | Location Printed | Covered by Latex |
|---|---|---|---|
| Game number: | 3 digits | Ticket back | No |
| Pack number: | 6 digits | Ticket back | No |
| Ticket number: | 3 digits | Ticket back | No |
| Validation number: | 9 digits | Ticket front | Yes |
| Security code: | 3 digits | Ticket front | Yes |
| Checksum: | 2 digits | Ticket front | Yes |

The bar codes printed on instant tickets typically use the Interleaved 2 of 5 (I 2 of 5) format. In such a bar code the information is arranged in pairs of digits. Each pair of digits corresponds to a single bar code character. So, the above 24 digits of data would be represented by twelve I 2 of 5 bar code characters. Since the game, pack and ticket number are often printed in human readable form on the back of the lottery ticket 10, there is no security reason to cover these digits with latex when printed in a bar code. Thus, in one embodiment of the invention, only those bar code characters that correspond to the validation information are concealed under the scratch-off material 32. In this case, that would correspond to the 12 digits of the validation number and security code. This results in the bar code 30 having just 12 of its 24 digits of data, or 50% of its data, covered by the scratch-off material 32.

However, this still results in a large portion of the bar code 30 being covered by the scratch-off material 32 because it is standard practice in the lottery industry to print the validation number in the I 2 of 5 bar code along with the inventory control information and the checksum. Often, one or more of the security code digits is not printed in the I 2 of 5 bar code. Accordingly it is preferable in certain cases to print a conventional I 2 of 5 bar code such as 30 with only the bar code characters corresponding to the security code obscured by the scratch-off material 32. Thus, in this example, only 2 of the 12 bar code characters are covered with the scratch-off material 32, or approximately 16.7% of the characters. This results in a lottery ticket 10 having the minimal amount of the scratch-off material 32 that has to be removed to validate the ticket 10 yet having security equivalent to conventional lottery tickets where the security digit(s) are not present in the bar code. Or, in bar codes where the security digits are present, covering the security digits with the scratch-off material 32 can increase security.

In another technique commonly used to print information in an I 2 of 5 bar code the 9-digit validation number and the 3-digit security code are compressed and encrypted into a 10-digit string of encrypted validation data. This encrypted string is then printed in the clear in the I 2 of 5 bar code along with the inventory control data and checksum. This results in an I 2 of 5 bar code containing 22 decimal digits or 11 bar code characters. With this type of bar code only a small amount of the code need be covered by the scratch-off material 32 to prevent it from being read by a bar code reader prior to the lottery ticket 10 being sold to the public. With a conventional 1-D code, such as I 2 of 5, only the smallest of obstructions can prevent the code from being read. In some cases, simply covering a single narrow space between two of the vertical bars of the bar code will prevent it from being read. However, if such a small covering were partially removed, prior to the sale to the public, it would probably not be noticed by the player. Therefore, it is preferable that the amount of scratch-off material 32 covering the bar code 30 should be sufficiently distinctive that its removal or tampering would be evident to a player.

Figure 3A:
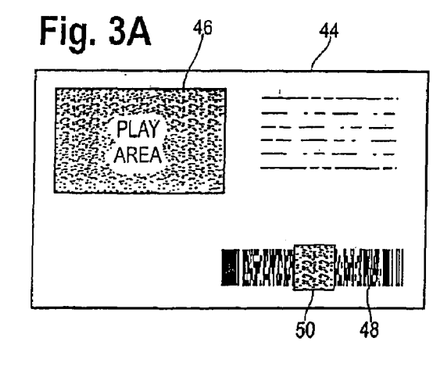
FIG. 3A is a plan view of the front of a lottery ticket having a bar code containing a security code where the bar code is partially covered by a scratch-off coating.
Figure 3B:
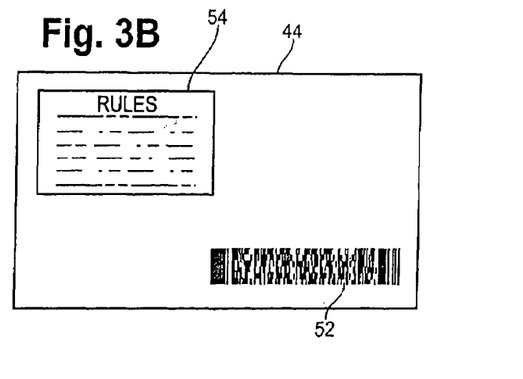
FIG. 3B is a plan view of the back of the lottery ticket of FIG. 3A having a bar code printed on the back of the ticket containing at a minimum all of the other data required to validate the ticket.

Referring to FIGS. 3A and 3B, one problem with placing a conventional lottery ticket bar code on the front of the ticket, such as the bar code 16 on the lottery ticket 10 shown in FIG. 1, is that the bar code 16 consumes valuable space that can otherwise be used for graphics, advertising, instructional information or the instant lottery game play data itself. That is why printing bar codes on the back of lottery tickets has become the industry standard. Furthermore, even if all of the data required to validate the lottery ticket is contained in the front bar code, partially or totally covered by latex, it is generally still desirable to have uncovered bar codes on lottery tickets that can be used for inventory control, manufacturing and distribution. In one embodiment of the invention depicted in FIGS. 3A and 3B, the front of a lottery ticket 44 is printed with a play area 46 and a small bar code 48. The bar code 48 can be either partially or totally covered by a scratch-off material 50. In this embodiment, the front bar code 48 preferably contains validation information and, as discussed above, it might be desirable to cover only a small portion of the bar code 48 such as the security code with the scratch-off material 50. The back of the lottery ticket 44 is then printed with a second uncovered bar code 52. As is conventional, the back of the lottery ticket can also be printed with human readable information such as a set of rules 54 for the game. In this embodiment, the second bar code 52 contains inventory information such as the game, pack, ticket number and a check sum and can include some or all of the validation data. Therefore, by printing the first bar code 48 on the front of the ticket, partially or totally covered by the scratch-off material 50, it is possible to provide secure keyless validation of the ticket by requiring that both bar codes be read during the validation process. The agent terminal can be provided with two bar code readers or a mirror arrangement of the type shown in U.S. Pat. No. 6,053,405 can be used for this purpose. Preferably, the small bar code 48 on the front of the lottery ticket 44 contains, at a minimum, the security digits or the checksum of some or all of the information in the back bar code that is at least partially concealed under the scratch-off material 50. Although it is preferable to cover this type of security information on the front bar code 48 with the scratch-off material 50, it should be noted that other types of information, for example, a portion of the inventory data can be covered by the scratch-off material 50 instead. In this case the object of covering at least a portion of the bar code 48 with the scratch-off material 50 is to prevent validation of the lottery ticket 44 by an agent terminal before the lottery ticket 44 is sold. The amount of the front bar code 48 covered by the scratch-off material 50 can be selected using the criteria discussed above in connection with the bar codes in FIGS. 1 and 2A–C.

It should be understood that the various embodiments of the invention described in connection with FIGS. 1, 2A–C and 3A–B only provide specific examples of how the invention can be implemented on a lottery ticket. The number and location of the bar code(s) and the portion covered by the scratch-off coatings will generally be governed by a number of factors including the type of lottery ticket, e.g., instant or probability, the physical size of the ticket, the size of the play area required, the amount of human readable and display information desired, the type of bar code used, e.g., 1-D or 2-D, the level of redundancy in the bar codes and the number and characteristics of bar code readers in the available agent terminals. Also, the lottery ticket can be configured in such a way that a portion of the scratch-off material 18 used to cover the play indicia in the play area 12 can be used to cover all or part of a bar code such as the bar code 48.

Figure 4A:
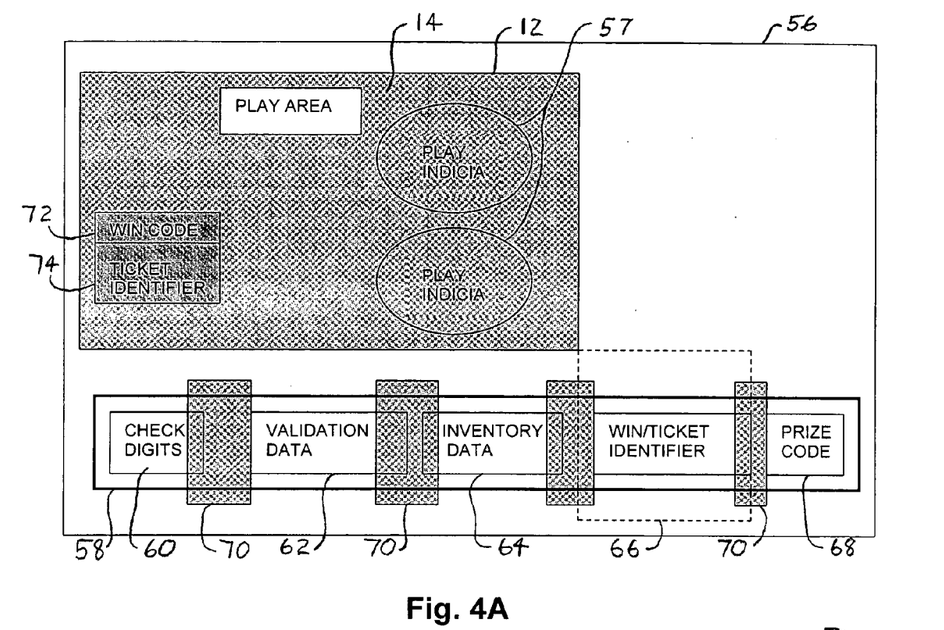
FIG. 4A is a plan view of the front of a lottery ticket having a bar code containing a number of different types of data of which selected portions can be covered or partially covered by a scratch-off coating along with a win code and security digits covered or partially covered by a scratch-off coating.
Figure 4B:
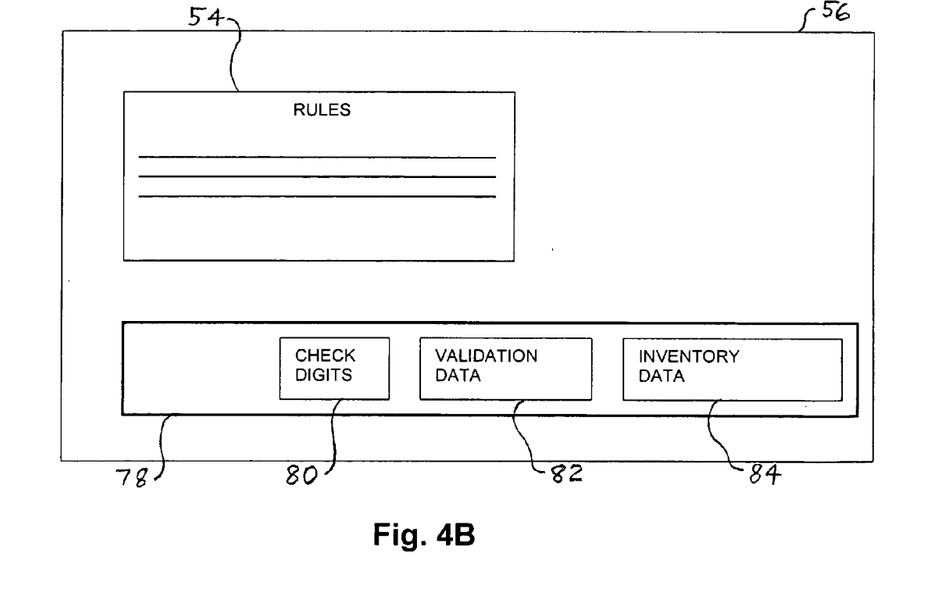
FIG. 4B is a plan view of the back of the lottery ticket of FIG. 4A having a bar code printed on the back of the ticket containing validation and inventory data.

FIGS. 4A and 4B depict alternate configurations of a lottery ticket 56 according to the invention. The front of the lottery ticket 56 is shown in FIG. 4A and includes the play area 12 scratch-off coating 14 which covers a set of play indicia 57. Included on the front of the lottery ticket 56 is a front bar code as indicated by a line 58 that can contain various types of information. To simplify the illustrations, the front bar code 58 is shown in FIG. 4A as having a number of different types of information rather that providing drawings that show every possible combination of information that can be contained in the bar code 58. Specifically, the information in the bar code 58 is shown as including a set of check digits 60. One object of the check digits 60 in this embodiment is to provide a level of confidence that at least certain portions of the data printed on the lottery ticket 56 is correct. The check digits can take the form of a check sum of validation numbers or the inventory data printed on the lottery ticket 56 or some other functional relationship, such as an integrity number of the type described in U.S. Pat. No. 4,685,079. Here the bar code 58 also includes a set of validation data 62, a set of inventory data 64, a win code along with a security code or ticket identifier 66 and a prize code 68. Again for simplicity of description, portions of the information 60-68 in the front bar code 58 are depicted as being covered by a scratch-off coating 70. For any particular embodiment of the invention, the portions, if any, of the front bar code 58 that are covered by the scratch-off coating 70 can be selected using the criteria discussed above in connection with the bar codes in FIGS. 1, 2A–C and 3A–B. In addition the front of the lottery ticket 56 includes a separate win code 72 and a ticket identifier 74 both printed preferably in encrypted machine readable form inside the play area 12 on the ticket 56. Alternatively, the win code 72 and ticket identifier 74 can be located outside of the play area 12 or in the bar code 58 as indicated at 66. The ticket identifier 74 can also be printed in human readable form on the lottery ticket 56 in another location on the lottery ticket 56 and covered by, for example, the scratch off coating 14. The ticket identifier 74 can be a function of the inventory data 64, the validation data 62, other data that might serve to identify the lottery ticket 56, or any combination of the this data. Preferably, the ticket identifier 74 is a check sum of selected data. Although the win code 72 and the ticket identifier 74 can be uncovered, it is preferable that at least a portion of these codes 72 and 74 be covered by the scratch-off coating 14 or a similar scratch-off coating if located outside of the play area 12. The win code 72 can be a simple encrypted binary code, printed for example in a 2D PDF format, indicating that the lottery ticket 56 is a winner or not. As described in U.S. Pat. No. 5,414,424, the advantage of the win code or win checker 72 is that a player can directly read the win code 72 at an agent terminal to determine if the lottery ticket 56 is a winner without a lottery agent having to take the time to read and validate the ticket 56. During validation in this embodiment of the invention, the ticket identifier 74 can be used to link the ticket being validated to the identity of the ticket 56 whose win code 72 has been read by a player ticket checker. Generally, it is preferable to locate the win code 72 and the ticket identifier 74 in a location other than on the bar code 58. As such, the location shown in FIG. 4A of the win code and ticket identifier 66 in the bar code 58 are indicated as an alternate by a dashed line 66.

Similarly, the back of the lottery ticket 56 is depicted in FIG. 4B as having a bar code 78 containing various types of information. In the illustration of FIG. 4B, the bar code 78 includes a set of check digits 80, a set of validation data 82 and a set of inventory data 84. As with the front bar code 58 depicted in FIG. 4A, the back bar code 78 is shown as having a number of different types of information rather that providing drawings that show every possible combination of this type of information that can be contained in the bar code 78. Although there might be certain circumstances where it would be desirable to cover all or portions of the data 80-84 in the back bar code 78 with a scratch-off coating, this data 80-84 will not be covered in the preferred embodiments of the invention in order to expedite validation or redemption of the lottery ticket 56 and to facilitate inventory and distribution of the lottery tickets 56. By the same token, placement of the win code 72 and the ticket identifier 74 on the back of the lottery ticket might be desirable under certain circumstances, but in the preferred embodiments of the invention, they are located on the front of the lottery ticket 56. It should be noted that, as is conventional in the manufacture of instant lottery tickets, the term imaging can be used to denote the printing of variable data such as the play indicia 57, the bar codes 58 and 78, the win code 72 and the ticket identifier 74 on the lottery ticket 56. Frequently, this data is applied to a lottery ticket substrate by an ink jet printer while display printing and scratch-off coatings or materials are typically applied by a gravure or flexographic printing process.

In most embodiments of the invention, the back bar code 78 will include the inventory data 84 but can include all or a portion of the ticket identifier data as well. The check digits 80 can be used to confirm all or just a predetermined portion of the data read from the back bar code 78. It should also be noted that the back bar code 78 can include the check digits 80 that can be used in a process confirm data read from the front bar code 58. If the check digits 60 or 80 do not confirm the data in the bar codes 78 or 58, the lottery ticket generally will be rejected.

As indicated above, the various embodiments of the invention can be structure based on such factors as: the physical size and layout of the lottery tickets; the prize structure; validation hardware available such as the configuration of agent terminals; and the level of security desired. These factors can also be balanced against certain general objectives such as minimizing the amount of machine readable data on the front of a lottery ticket, for example, the size of a bar code and minimizing the amount of scratch-off material that a player is required to remove to redeem a lottery ticket. The invention can include the following representative embodiments.

First, the lottery ticket 56 can include only the validation data 62, partially or completely covered by the scratch-off coating 70, on the front of the ticket 56 with only the inventory data 64 printed on the back of the ticket 56. A variation of this embodiment can include the check digits 60 or 80 printed on the front or back of the ticket 56 that would link the two codes 62 and 82.

Another embodiment can include a portion of the validation data 62, partially or completely covered by the scratch-off coating 70, on the front of the lottery ticket 56 with the inventory data 64 and only a portion of the validation data 62 printed on the back of the ticket 56 and the check digits 60 and 80 printed on both sides of the ticket 56.

Figure 5:
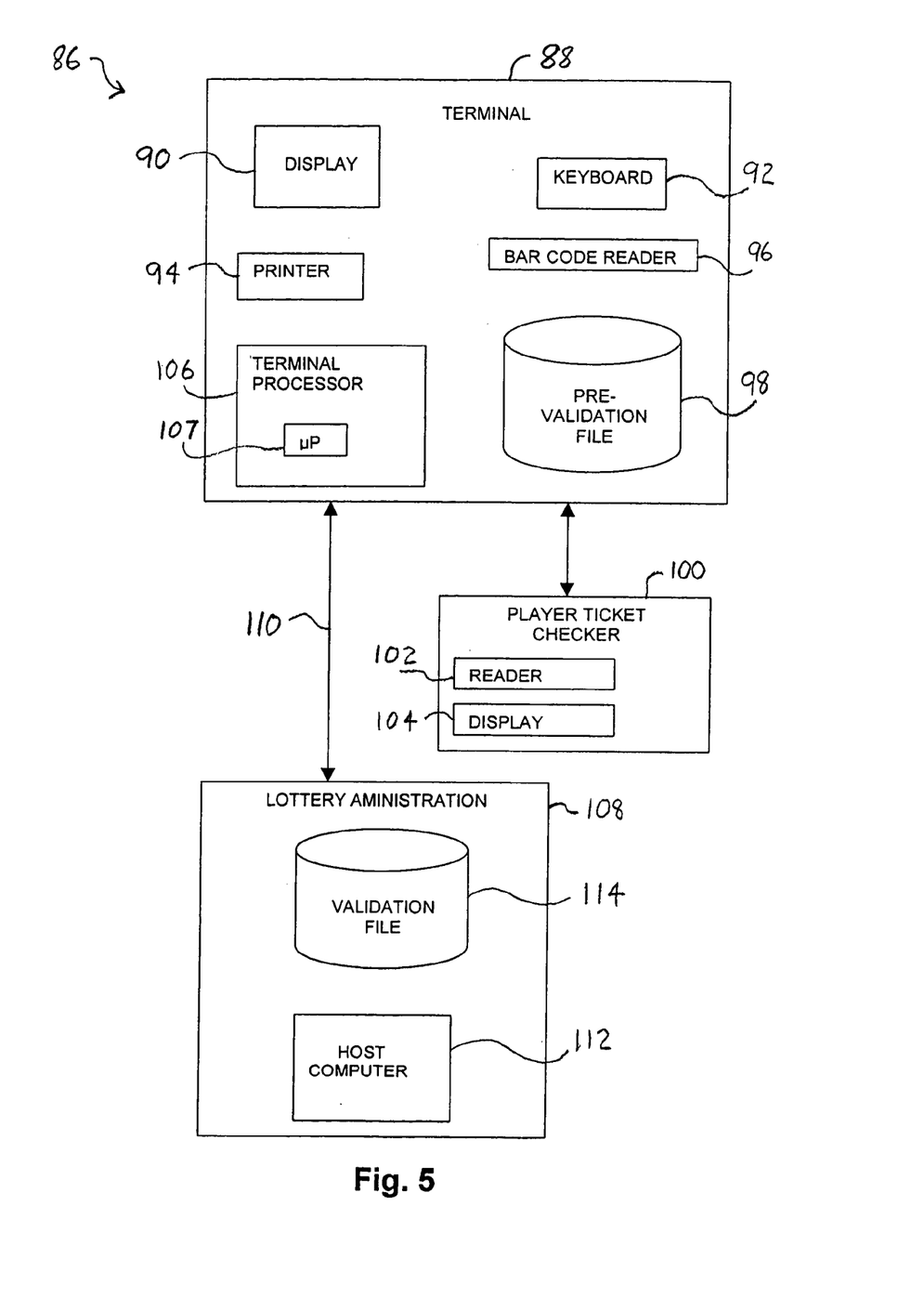
FIG. 5 is a block diagram of an apparatus for validating and redeeming lottery tickets of the type shown in FIGS. 4A and 4B.

In a third embodiment, the lottery ticket 56 includes the inventory data 84 and a portion of the validation data printed on the back of the ticket 56 and further includes the win code 72 and the ticket identifier 74 printed on the front of the ticket 56 where the ticket identifier 74 is printed in human readable form. During redemption, the win code 72 and the ticket identifier 74 are read by the ticket checker 100 and if the ticket identifier is not read by the ticket checker 100, a lottery agent can enter the ticket identifier digits 74 via the keyboard 92 into the terminal 88.

The lottery ticket 56 in a fourth embodiment can include the prize code 68 which is at least partially covered by the scratch-off coating 70 along with the check digits 60 that represent all or part of the information in the back bar code 78 including the inventory data 84. In addition to the prize code 68, the front bar code 58 can include at least a portion of the validation data 62 that can be uncovered or partially covered by the scratch-off coating 70.

FIG. 5 is a block diagram of a lottery system 86 that can be used to redeem and validate lottery tickets such as the lottery ticket 56. Included in the lottery system 86 are a number of agent terminals such as an agent terminal 88. The agent terminal 88 can include such elements as: one or more displays such as a display 90 for displaying information to lottery agents and players; a keyboard 92 for permitting a lottery agent to enter information into the agent terminal 88; a printer 94; a bar code reader 96 which preferably has the capability of reading bar codes on both the front and back of a lottery ticket; and a pre-validation file 98. In some embodiments of the invention, the keyboard 92 can be used by a lottery agent to enter the ticket identifier 74 into the terminal 88 when they are printed on the lottery ticket 56 in human readable form. The apparatus 86 also includes a player ticket checker 100, which has a reader 102 that can be, for example, a 2D PDF reader which can be used by a player to read the win code 72 and the ticket identifier 74 on the lottery ticket 56. The ticket checker can also include a display 104 to communicate to the player if the lottery ticket 56 is a winner or not. A terminal processor 106 that preferably includes a microprocessor 107 is used to control the various operating elements of the agent terminal 88 such as element 90-98. As is conventional in the lottery industry, the terminals such as the agent terminal 88 are connected to a lottery administration data processing system 108 as indicated by a line 110 where the system 108 typically includes a number of functional elements such as a host computer 112 and a validation file 114.

Figure 6:
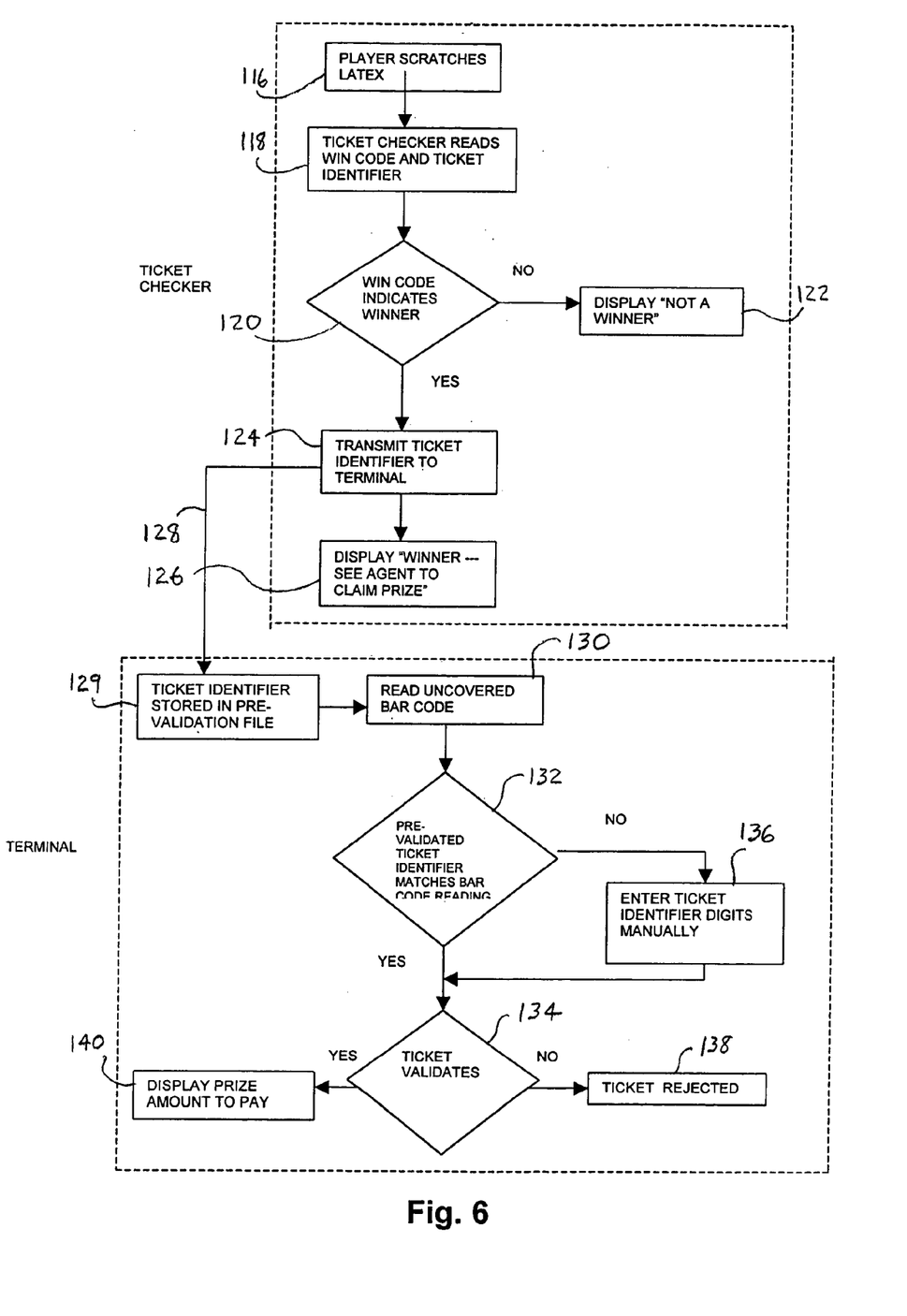
FIG. 6 is a logic flow diagram of a process for redeeming lottery tickets of the type shown in FIGS. 4A and 4B.

FIG. 6 illustrates the operation of a representative embodiment of a redemption process for a lottery ticket having at least some of the elements of the lottery ticket 56 shown in FIGS. 4A–B. In this embodiment the win code 72 is used although in some embodiments it might be desirable to only use the ticket identifier 74. First, as indicated by a box 116, a player purchases the lottery ticket 56 and in this example scratches off the scratch-off coating 14 that covers the play indicia 57 as well as both the win code 72 and the ticket identifier 74. Then, as shown in a box 118, the player uses the player ticket checker 100 to read the win code 72. In the preferred embodiment, the player ticket checker 100 can also, at the same time, read the ticket identifier 74. One of the advantages of this embodiment is that the ticket identifier 74 is entered automatically into the terminal 88 via the player ticket checker 100. It should be noted here that as an alternative, the bar code reader 96 can be used to read the win code and the ticket identifier 66 after a portion of the scratch-off coating 70 has been removed in the event that these codes are located in the bar code 58. It is, however, considered preferable to locate the win code 72 and the ticket identifier 74 separate from the bar code 58 as shown by the locations of these codes 72 and 74 in FIG. 4A. The ticket identifier 74 can also be printed in human readable form facilitating the entry of the security digits 66 into the terminal 88 using the keyboard 92 if the security digits in the ticket identifier 74 cannot be entered automatically. In this embodiment of the process, after the win code 72 has been read, it is checked by the processor 106 as indicated at a decision block 120. If as shown by a block 122 the win code 72 indicates that the lottery ticket 56 is not a winner, the redemption process ends and the lottery ticket 56 will generally be disposed of by the player. If on the other hand the win code 72 indicates that the lottery ticket 56 is a winner, the ticket checker 100, as shown by a block 124, will transmit the ticket identifier 74 to the terminal 88. Also, as illustrated by a block 126, the ticket checker 100 can display a message such as "winner—see agent to claim prize" on the display 104 after the ticket identifier 74 has been sent to the terminal 88. The ticket identifier 74 will then be sent to the agent terminal 88 as represented by a line 128 and stored into the pre-validation file 98 as indicated by a block 129. It should be noted that in some embodiments, the pre-validation file 98 can initially be empty or null and as each ticket identifier 74 is read by the ticket checker 100 at the step 118, the pre-validation file 98 will be built as tickets are presented for validation. When the player presents the ticket 56 for payment the front bar code 58, the back bar code 78 or both bar codes are read as indicated by a block 130. At this point in this example of the process, the processor 106 determines if the corresponding ticket identifier 74 is represented in the pre-validation file 98, as indicated in a decision block 132. If the ticket identifier 74 matches an entry in the pre-validation file 98, then in this embodiment, the process proceeds to validate the lottery ticket 56 as represented by a decision block 134. If the ticket identifier 74 does not exist in the pre-validation file 98 or is not successfully read by the data reader 102, then the agent can use the human readable ticket identifier 74 on the lottery ticket 56 and enter it into the terminal 88 manually via a keyboard 92 as shown by a block 136. It will be appreciated that this process can also be used to determine if the scratch-off coating has been properly removed. After a successful confirmation of the ticket identifier 74, this particular embodiment of the process validates the lottery ticket 56 as indicated by the decision block 134. For example, the processor 106 can use the validation data 62 or 82 in combination with game information stored in the terminal 88 to validate low tier lottery tickets that have low redemption values and for high tier lottery tickets having high redemption values, the processor 106 can communicate with the lottery administration 108 to perform the validation process 134. If the lottery ticket 56 has not been successfully validated, then the ticket 56 is rejected as shown in a block 138. On the other hand if the lottery ticket 56 is validated, conventional methods can be used to pay the player the redemption value of the lottery ticket 56. As an example, the agent terminal display 90 can be used to display the winning amount which is then typically paid to the player by the agent as indicated by a block 140.

We claim:

1. A method for making a lottery ticket comprising the steps of:
   imaging play indicia on a substrate;
   imaging a first set of data in a bar code format on said substrate;
   covering said play indicia by a first scratch-off material; and
   covering said first set of data with a second scratch-off material covering a portion but not all of said first set of data.

2. The method of claim 1 wherein at least a first portion of said first set of data is functionally related to said play indicia.

3. The method of claim 2 wherein said portion of said first set of data includes validation data at least a portion of which is covered by said second scratch-off coating.

4. The method of claim 2 wherein said portion of said first set of data includes inventory data at least a portion of which is covered by said second scratch-off coating.

5. The method of claim 2 wherein said portion of said first set of data includes at least one check digit at least a portion of which is covered by said second scratch-off coating.

6. The method of claim 2 wherein said step of covering said portion of said first set of data with said second scratch-off coating includes covering any of said first set of data that is redundant to said first portion covered by said second scratch-off material and required to machine read said first set of data.

7. The method of claim 1 wherein of said first set of data is in the form of code words having a predetermined level of redundancy and wherein said second scratch-off material covers a greater number of said code word words than are defined by said level of redundancy.

8. The method of claim 1 additionally including a step of printing a human readable warning in an ink that will not interfere with optical reading of said bar code beneath said second scratch-off material.

9. The method of claim 1 wherein said bar code includes a set of inventory data and said second scratch-off material does not cover said inventory data.

10. The lottery ticket of claim 1 wherein said bar code includes a set of validation data and wherein said second scratch-off material covers at least a portion of said validation data.

11. The lottery ticket of claim 1 wherein said bar code includes a set of check digits and wherein said second scratch-off material covers at least portion of said validation data.

12. The method of claim 1 wherein said bar code includes a prize code and wherein said second scratch-off material covers at least portion of said prize code.

13. The method of claim 1 wherein said bar code includes a ticket identifier and wherein said second scratch-off material covers at least portion of said ticket identifier.

14. The method of claim 1 additionally including a step of imaging a win code and a ticket identifier on said substrate.

15. The method of claim 14 wherein said step of covering said play indicia by a first scratch-off material additionally includes covering said win code and at least a portion of said ticket identifier with said first scratch-off coating.

16. A method for making a lottery ticket comprising the steps of:
   imaging play indicia on a front side of a lottery ticket;
   covering said play indicia by a first scratch-off material;
   imaging a first bar code including validation data printed on said front side;
   imaging a second bar code including inventory data on a back side of said lottery ticket; and
   printing a second scratch-off material covering at least a portion said first bar code.

17. The lottery ticket of claim 16 wherein a second scratch-off material covers only a portion but not all of first said bar code.

18. The lottery ticket of claim 16 wherein said first bar code includes a set of check digits functionally related to at least a portion of the data in said back bar code.

19. The lottery ticket of claim 16 wherein said first bar code includes a set of check digits functionally related to at least a portion of the inventory data in said back bar code.

20. The method of claim 16 additionally including a step of imaging a win code and a ticket identifier adapted to be read by a player ticket checker on said front side of said lottery ticket.

21. The method of claim 20 wherein said step of covering said play indicia by a first scratch-off material additionally includes covering said win code and at least a portion of said ticket identifier with said first scratch-off coating.

22. A method for making a lottery ticket comprising the steps of:
   imaging play indicia on a front side of a lottery ticket;
   covering said play indicia by a first scratch-off material;
   imaging a win code on said front side;
   imaging a ticket identifier on said front side; and
   covering said win code and at least a portion of said ticket identifier with a second scratch-off coating.

23. The method of claim 22 wherein said step of covering said play indicia by a first scratch-off material additionally includes covering said win code and at least a portion of said ticket identifier with said first scratch-off coating.

24. A lottery ticket comprising:
a substrate having a first and a second side;
a play area at least partially covered by a first scratch-off material on said first side;
a machine readable win code printed on said first side;
a ticket identifier, adapted to be read by a player ticket checker, printed on said first side; and
a second scratch-off material covering said ticket identifier.

25. The lottery ticket of claim 24 wherein second scratch-off material covering said ticket identifier is the same as said first scratch-off material.

26. A lottery ticket comprising:
a substrate having a first and a second side;
a play area at least partially covered by a first scratch-off material on said first side;
a set of identifying data printed on said substrate that identifies the lottery ticket; and
a ticket identifier at least partially covered by a second scratch-off material and printed on said substrate in both a machine readable and a human readable format wherein said ticket identifier is functionally related to at least a portion of said identifying data.

27. The lottery ticket of claim 26 wherein said second scratch-off material is included in said first scratch-material.

28. The lottery ticket of claim 26 additionally including a win code printed on said substrate wherein said second scratch-off material covers said win code.

29. The lottery ticket of claim 26 wherein at least a portion of said identifying data is printed in a bar code format and said ticket identifier is located in said bar code.

30. The lottery ticket of claim 26 wherein said play area, said win code and said ticket identifier are located on a first side of said substrate and wherein said win code and said ticket identifier are covered by a scratch-off material.

31. The lottery ticket of claim 26 wherein at least a portion of said identifying data functionally related to said ticket identifier is inventory data.

32. The lottery ticket of claim 26 wherein at least a portion of said identifying data functionally related to said ticket identifier is validation data.

33. The lottery ticket of claim 26 wherein said ticket identifier is a check sum of said portion of said identifying data.

* * * * *